United States Patent
Bhooi et al.

(10) Patent No.: US 10,856,038 B2
(45) Date of Patent: Dec. 1, 2020

(54) PREDICTIVE TIME-SHIFT BUFFERING FOR LIVE TELEVISION

(71) Applicant: Sling Media Pvt. Ltd., Bangalore (IN)

(72) Inventors: Jeevan Bhooi, Bangalore (IN); Preetham Kotian, Bangalore (IN)

(73) Assignee: Sling Media Pvt. Ltd., Bangalore (IN)

( * ) Notice: Subject to any disclaimer, the term of this patent is extended or adjusted under 35 U.S.C. 154(b) by 0 days.

(21) Appl. No.: 16/109,759

(22) Filed: Aug. 23, 2018

(65) Prior Publication Data

US 2020/0068250 A1 Feb. 27, 2020

(51) Int. Cl.
*H04N 21/433* (2011.01)
*H04N 21/458* (2011.01)

(52) U.S. Cl.
CPC ....... *H04N 21/4331* (2013.01); *H04N 21/458* (2013.01)

(58) Field of Classification Search
CPC ............ H04N 21/4331; H04N 21/458; H04N 21/2187; H04N 21/23109; H04N 21/26283; H04N 21/4334
USPC ....................................................... 725/142
See application file for complete search history.

(56) References Cited

U.S. PATENT DOCUMENTS

| | | | |
|---|---|---|---|
| 7,263,280 B2 | 8/2007 | Bullock et al. | |
| 7,454,126 B2 | 11/2008 | Imanishi | |
| 7,848,613 B2 | 12/2010 | Osborne | |
| 8,045,841 B2 | 10/2011 | Ahn | |
| 8,087,059 B2 | 12/2011 | Chen et al. | |
| 8,190,004 B2 | 5/2012 | Lee et al. | |
| 8,660,409 B2 | 2/2014 | DeLuca et al. | |
| 8,677,406 B2 | 3/2014 | Berkoff | |
| 8,929,710 B2 | 1/2015 | Fitzsimmons | |
| 9,014,531 B2 | 4/2015 | Gokurakuji et al. | |
| 9,055,268 B2 | 6/2015 | Viveganandhan et al. | |
| 9,344,668 B2 | 5/2016 | Lang et al. | |
| 10,028,011 B2 * | 7/2018 | Yao | H04N 21/25833 |
| 2002/0174430 A1 * | 11/2002 | Ellis | G11B 27/34 |
| | | | 725/46 |
| 2007/0133938 A1 | 6/2007 | Park | |
| 2007/0150555 A1 | 6/2007 | He et al. | |
| 2008/0069514 A1 | 3/2008 | Son et al. | |
| 2009/0300700 A1 | 12/2009 | Yeh et al. | |

(Continued)

*Primary Examiner* — Nnenna N Ekpo
(74) *Attorney, Agent, or Firm* — Kilpatrick Townsend & Stockton LLP

(57) ABSTRACT

Novel techniques are described for predictive time-shift buffering for live television and persistent recording thereof. For example, upcoming program data can be obtained, and a candidate program can be identified from the upcoming program data as likely to be viewed live via the television receiver. An automated time-shift buffer (ATSB) trigger time and an ATSB flush time can be determined in accordance with a program start time associated with the candidate program. At the ATSB trigger time, it can be determined whether the candidate program is being viewed. If not, a time-shift buffer can be directed to begin buffering the candidate program in accordance with the program start time. At the ATSB flush time, it can be determined whether the candidate program is still not being viewed live. In that case, the time-shift buffer can be directed automatically to flush as-yet-buffered data of the candidate program.

20 Claims, 5 Drawing Sheets

(56) References Cited

U.S. PATENT DOCUMENTS

| | | | |
|---|---|---|---|
| 2011/0083073 A1* | 4/2011 | Atkins | H04N 21/4147 |
| | | | 715/704 |
| 2012/0060194 A1 | 3/2012 | Alexander | |
| 2012/0087638 A1 | 4/2012 | Han et al. | |
| 2012/0321278 A1 | 12/2012 | Walker et al. | |
| 2013/0136411 A1 | 5/2013 | Herby et al. | |
| 2014/0282758 A1 | 9/2014 | Yu et al. | |
| 2015/0179226 A1* | 6/2015 | Willard | G11B 27/28 |
| | | | 386/241 |
| 2017/0142476 A1 | 5/2017 | Wang | |

* cited by examiner

PREDICTIVE TIME-SHIFT BUFFERING FOR LIVE TELEVISION

FIELD

This invention relates generally to live television receiver systems, and, more particularly, to predictive time-shift buffering for live television and persistent recording of time-shift-buffered programming.

BACKGROUND

Television users have become accustomed to increased flexibility when watching television. For example, subscribers to television programming, such as satellite television programming, often have access to hundreds of channels, advanced program guides, on-demand programming, digital video recording and storage, and other features that provide viewing flexibility. Often television programming and related features are provided through specialized equipment, like set-top boxes and other appliances. Some television programming providers and television appliances permit users to navigate live television using interface controls (e.g., pause, rewind, and/or other buttons on a remote control), which can involve temporarily buffering the live television content as it is received. Conventional approaches to such buffering tend to be limited in a number of ways. For example, such approaches typically only buffer while the user is tuned into a program, limiting viewers to rewind only to the time when they first tuned in; and such approaches tend to flush the buffer when the television is turned off, limiting viewers to accessing the content only while they remain tuned in.

BRIEF SUMMARY

Among other things, embodiments provide novel systems and methods for predictive time-shift buffering for live television and persistent recording of time-shift-buffered programming. For example, upcoming program data can be obtained to identify upcoming live television programs, and a candidate program can be identified from the upcoming program data as likely to be viewed live via the television receiver. An automated time-shift buffer (ATSB) trigger time and an ATSB flush time can be determined in accordance with a program start time associated with the candidate program. At the ATSB trigger time, a determination can be made as to whether the candidate program is being viewed live. If not, a time-shift buffer can be directed to begin buffering the candidate program in accordance with the program start time. At the ATSB flush time, a determination can be made as to whether the candidate program is still not being viewed live. In that case, the time-shift buffer can be directed automatically to flush as-yet-buffered data of the candidate program.

According to one set of embodiments, a method is provided for time-shift buffering of live television programming by a television receiver having a time-shift buffer configured as non-persistent storage. The method includes: obtaining upcoming program data identifying a plurality of live television programs; identifying a candidate program from the upcoming program data, such that the candidate program identifies one of the plurality of live television programs as likely to be viewed live via the television receiver; determining an automated time-shift buffer (ATSB) trigger time and an ATSB flush time in accordance with a program start time associated with the candidate program; determining whether the candidate program is being viewed live via the television receiver at the ATSB trigger time; and automatically in response to determining that the candidate program is not being viewed live via the television receiver at the ATSB trigger time: directing the time-shift buffer to begin buffering the candidate program in accordance with the program start time; and directing the time-shift buffer to flush as-yet-buffered data of the candidate program automatically in response to determining that the candidate program is still not being viewed live via the television receiver at the ATSB flush time.

According to another set of embodiments, a live television record control system associated with a television receiver is provided. The system includes: an object parser to receive a program listing identifying a plurality of live television programs scheduled as deliverable via the television receiver, and to output upcoming program data identifying the plurality of live television programs; a prediction engine coupled with the object parser to identify a set of candidate programs from the upcoming program data, such that each candidate program identifies a corresponding one of the plurality of live television programs as likely to be viewed live via the television receiver; and an ATSB controller coupled with the prediction engine to, for each of the set of candidate programs: determine an automated time-shift buffering (ATSB) trigger time and an ATSB flush time in accordance with a program start time associated with the candidate program; determine whether the candidate program is being viewed live via the television receiver at the ATSB trigger time; and automatically in response to determining that the candidate program is not being viewed live via the television receiver at the ATSB trigger time: direct a time-shift buffer to begin buffering the candidate program in accordance with the program start time; and direct the time-shift buffer to flush as-yet-buffered data of the candidate program automatically in response to determining that the candidate program is still not being viewed live via the television receiver at the ATSB flush time.

According to another set of embodiments, a non-transitory processor-readable medium is provided, including processor-readable instructions that cause one or more processors of a television receiver to: obtain upcoming program data identifying a plurality of live television programs; identify a candidate program from the upcoming program data, such that the candidate program identifies one of the plurality of live television programs as likely to be viewed live via the television receiver; determine an automated time-shift buffer (ATSB) trigger time and an ATSB flush time in accordance with a program start time associated with the candidate program; determine whether the candidate program is being viewed live via the television receiver at the ATSB trigger time; and automatically in response to determining that the candidate program is not being viewed live via the television receiver at the ATSB trigger time: direct a time-shift buffer associated with the television receiver to begin buffering the candidate program in accordance with the program start time; and direct the time-shift buffer to flush as-yet-buffered data of the candidate program automatically in response to determining that the candidate program is still not being viewed live via the television receiver at the ATSB flush time.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

Figure 1:
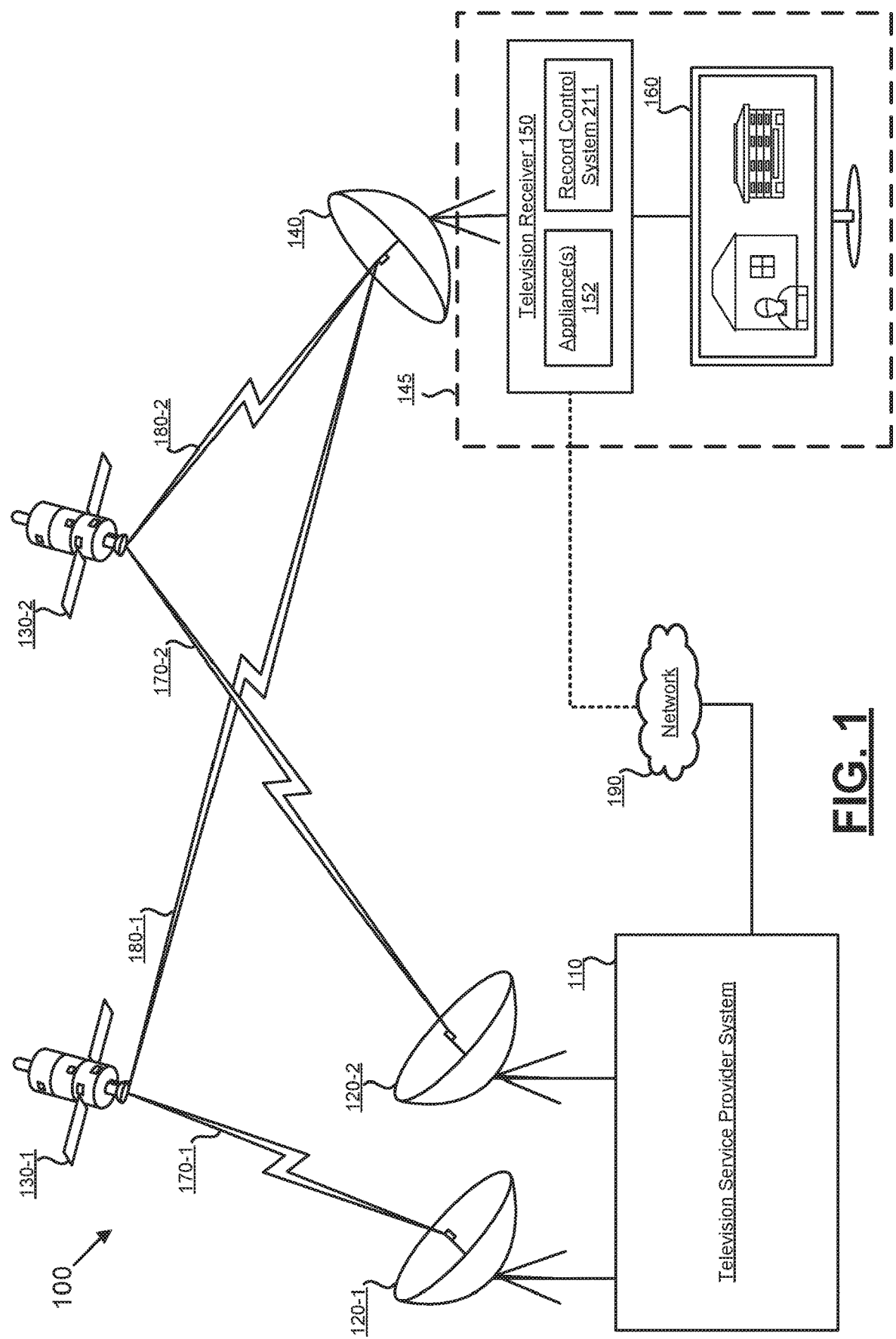
FIG. 1 shows an illustrative satellite television distribution system as context for various embodiments described herein.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Many television viewers enjoy being able to navigate live television viewing an a manner similar to navigating recorded and/or on-demand programming. For example, even though the television programming is being broadcast as part of a linear broadcast schedule of a television channel, viewers may desire being able to pause, rewind, and/or otherwise navigate through the content. Such functionality can be provided using a time-shift buffer that is part of, or otherwise associated with, a television receiver appliance (e.g., a set-top box). Conventionally, such time-shift buffers are configured to buffer a program while a viewer is watching the program. For example, the time-shift buffer begins buffering when a viewer's television is turned on and tuned to the channel showing that program; and the time-shift buffer stops buffering, and automatically flushes (e.g., deletes) its contents, when the television is turned off.

Such conventional approaches can carry certain limitations. As one example, suppose that a viewer tunes into her favorite television program five minutes after it begins. A conventional time-shift buffer approach would tend to start buffering five minutes into the program (when the viewer tunes in), and navigation of the buffered content would not permit the viewer to rewind beyond that time when buffering began (e.g., the viewer would be unable to rewind to the beginning of the show). As another example, suppose that, while watching a live television program, a viewer decides that she wants to record the program. A conventional time-shift buffer implementation would tend either to not include recording functionality at all; or to permit recording only of the buffered content (i.e., beginning only from when the viewer tuned into the program).

Embodiments described herein include novel techniques, such as predictive techniques, for time-shift buffering of live television programming by a television receiver. For example, upcoming program data can be obtained (e.g., from an electronic program guide) to identify a plurality of live television programs. One or more candidate programs can be identified from the upcoming program data, such that each candidate program corresponds to one of the plurality of live television programs that is likely to be viewed live via the television receiver. In response to determining that the candidate program is not being viewed live via the television receiver by some determined automated time-shift buffer (ATSB) trigger time (e.g., that the television program is starting, but the viewer is not yet tuned in), the time-shift buffer can be directed automatically to begin buffering the candidate program in accordance with the program start time (e.g., automatically to tune into the program and begin buffering). In the event it is determined that that the viewer still has not tuned into the program by some predetermined ATSB flush time (e.g., some amount of time after the program begins), the time-shift buffer can be directed automatically to flush as-yet-buffered data of the candidate program. In this way, a viewer who tunes into a program late may still be able to navigate back to a time in the program before the viewer tuned in. Some embodiments provide additional features, such as enhanced recording and/or other functionality, as described herein.

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

FIG. 1 shows an illustrative satellite television distribution system 100 as context for various embodiments described herein. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from television service provider system 110 via satellites 130. Further, while embodiments are described in particular context of a satellite television distribution system 100, techniques described herein can also be implemented in context of other television and media distribution architectures and infrastructures, such as cable television distribution networks.

The user equipment is shown disposed at a subscriber premises 145. The subscriber premises 145 can be a subscriber's home, office, or any suitable location associated with a particular subscriber at which to locate the subscriber's satellite dish 140 and television receiver 150. As one example, the satellite dish 140 is mounted to an exterior location (e.g., wall, roof, etc.) of the subscriber's home, and cables run from the satellite dish 140 to the television receiver 150, which is located inside the subscriber's home;

and one or more display devices 160 (e.g., televisions) is coupled with the television receiver 150 and located in the subscriber's home.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment 120 may communicate with the same or with different satellites 130. Different television channels may be transmitted to satellites 130 from different instances of transmitting equipment 120. For instance, a different satellite dish of satellite transmitter equipment 120 may be used for communication with satellites 130 in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites 130. Different television channels may also be carried using different transponders of the same satellite 130; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
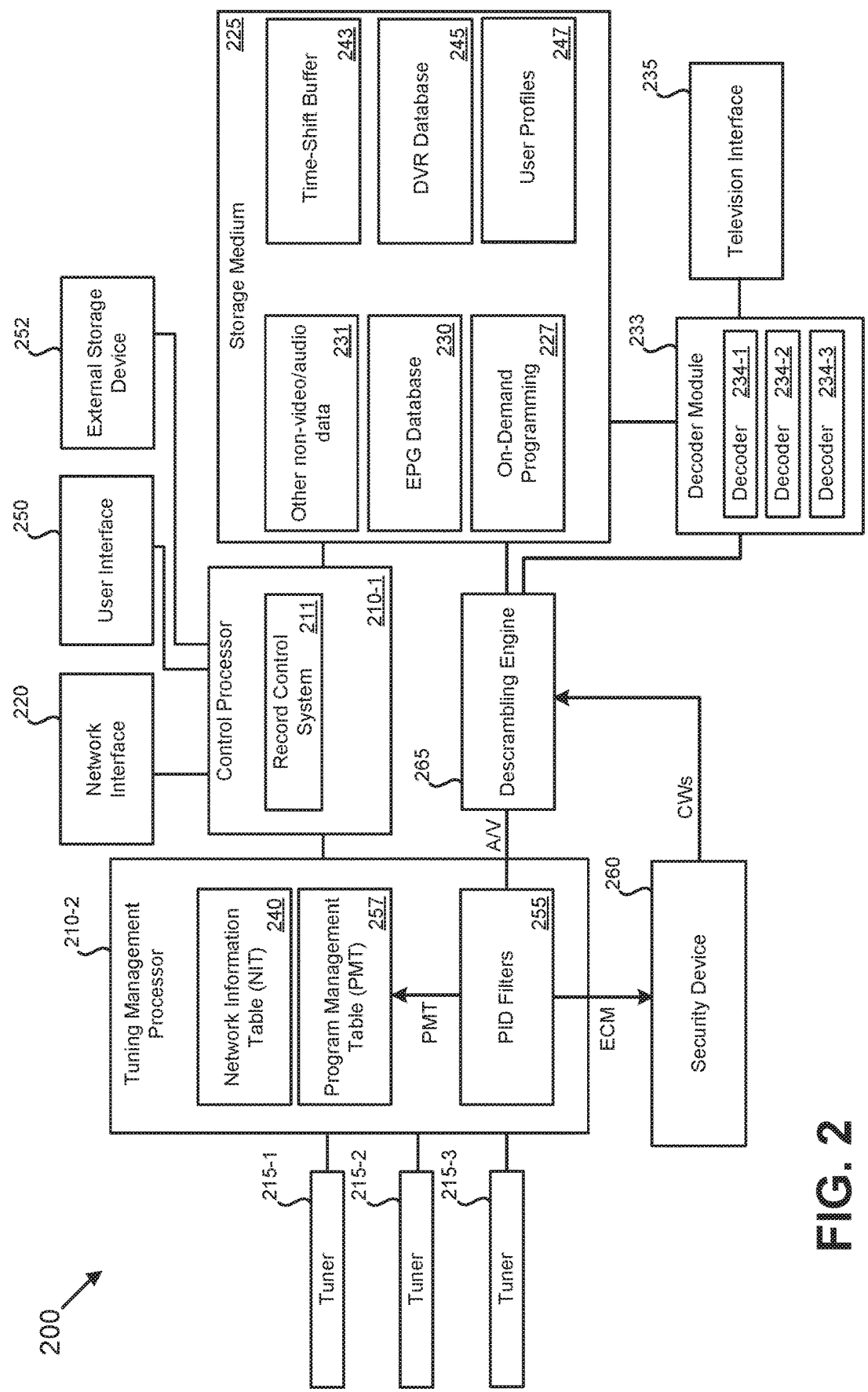
FIG. 2 shows an illustrative television receiver, according to various embodiments.

In communication with satellite dish 140 may be one or more television receivers 150. Television receivers 150 may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television, and/or such circuitry can be implemented in multiple appliances. While FIG. 1 illustrates an embodiment of television receiver 150 as separate from display device 160, it should be understood that, in other embodiments, similar functions may be performed by a television receiver integrated with display device 160.

As shown, the television receiver 150 can be implemented as one or more appliances 152. For example, the television receiver 150 can include a STB and an over-the-top (OTT) appliance, a master STB in communication with distributed slave STBs (e.g., in communication via the local network of the LAN router 155 or via a separate local network enabled by the STB), etc. Though not shown, some implementations of the television receiver 150 include a modem, or the like. For example, the illustrated satellite network can be used to provide both televisions services and other communications services, such as Internet services. In such implementations, the network 190 can be implemented by the satellite communications network. For example, the output of the modem can be coupled (e.g., via a splitter) to both television receiver 150 components (e.g., a STB) and a local area network (LAN) router, or the like. The television receiver 150 can also include a record control system 211, which is described in more detail below.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality then later outputting the television channel from the storage medium), the television channel may be considered to be viewed "live."

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

Network 190 may serve as a secondary communication channel between television service provider system 110 and television receiver 150. However, in many instances, television receiver 150 may be disconnected from network 190 (for reasons such as because television receiver 150 is not configured to connect to network 190 or a subscriber does not desire or cannot connect to network 190). As such, the connection between network 190 and television receiver 150 is represented by a dotted line. Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 2 shows an illustrative television receiver 200, according to various embodiments. Television receiver 200 may be configured to enable novel techniques for predictive and/or other time-shift buffering and persistent storage of live television, as described herein. Embodiments of the television receiver 200 are implementations of the television receiver 150 of FIG. 1 (or one or more appliances 152 of the television receiver 150 of FIG. 1). Television receiver 200 can be in the form of a separate device configured to be connected with a display device, such as a television; and can include one or more appliances, such as set top boxes (STBs). Additionally or alternatively, some or all of the television receiver 200 can be incorporated as part of another device, such as a television, other form of display device, video game console, computer, mobile phone or tablet, or the like. For example, a television may have an integrated television receiver (which does not involve an external STB being coupled with the television). Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, networking information table (NIT) 240, digital video recorder (DVR) database 245 (which may include provider-managed television programming storage and/or user-defined television programming), time-shift buffer 243, on-demand programming 227, user profiles 247, user interface 250, external storage device 252, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID (packet identifier) filters 255 may be handled by separate hardware from program management table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user interface 250. Control processor 210-1 may handle incoming data from network interface 220 and user interface 250. Additionally, control processor 210-1 may be configured to output data via network interface 220.

Control processor 210-1 may include a record control engine 211. Embodiments of the record control engine 211 can enable novel recording functionality, including predictive time-shift-buffering of live television content. In some embodiments, the record control system 211 can obtain upcoming program data identifying a plurality of live television programs, for example, from the EPG database 230. The record control system 211 can identify a candidate program from the upcoming program data, such that the candidate program identifies one of the plurality of live television programs as likely to be viewed live via the television receiver. For example, the record control system 211 can consult user profiles 247 and/or can have stored viewing data from which to identify programs likely to be viewed live by a viewer. Embodiments can determine an automated time-shift buffer (ATSB) trigger time and an ATSB flush time in accordance with a program start time associated with the candidate program.

Using data from the television interface 235, one or more user interfaces 250, and/or any other suitable information, embodiments of the record control system 211 can determine whether the candidate program is being viewed live via the television receiver at the ATSB trigger time. If so, the time-shift buffer 243 should already be buffering the candidate program in that case, in accordance with its normal operation. If the candidate program is not being viewed live as of the ATSB trigger time, embodiments of the record control system 211 can direct the time-shift buffer 243 to begin buffering the candidate program in accordance with the program start time. This can involve directing the tuning management processor 210-2 and/or other components to tune to the television channel on which the candidate program is being shown. At the ATSB flush time, the record control system 211 can again determine whether the candidate program is being viewed (i.e., if a viewer began watching the program between the ATSB trigger time and the ATSB flush time). If so, the time-shift buffer 243 can continue to buffer the program in its normal fashion (except that the time-shift buffer 243 will additionally have, stored thereon, portions of the candidate program that occurred after the ATSB trigger time and before the viewer began watching). If the record control system 211 determines that the candidate program is still not being watched as of the ATSB flush time, embodiments can direct the time-shift buffer 243 automatically to flush as-yet-buffered data of the candidate program.

In some cases, while the time-shift buffer is buffering the candidate program and a viewer is watching the program, the record control system 211 can receive a record command from a user interface device of the viewer (e.g., from a remote control or other user interface device via one or more user interfaces 250). In response to the record command, embodiments of the record control system 211 can direct storage, to a persistent data store (e.g., the DVR database 245 or an external storage device 252), of at least the as-yet-buffered data of the candidate program responsive to the record command. As described below, such storage can be performed in various ways. For example, directing the time-shift buffer 243 to buffer the candidate program can involve allocating a dedicated file space in the buffer to the candidate program; and directing storage of the buffered data to a persistent data store can involve moving the dedicated file space to the persistent storage (or tagging the file data to be treated as persistent).

Tuners 215 may include one or more tuners used to tune to transponders that include broadcasts of one or more television channels. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via one or more networks, such as the Internet. For example, as described with reference to FIG. 1, television receiver 150 may be able to communicate with television service provider system 110 via a network 190, such as the Internet. This communication may be bidirectional: data may be transmitted from television receiver 150 to television service provider system 110 and from television service provider system 110 to television receiver 150. Any suitable information may be transmitted and/or received via network interface 220. For instance, instructions (e.g., regarding subscription portability) from a television service provider may also be received via network interface 220, if connected with the Internet. Network interface 220 may be used to provide a confirmation to a television service provider that instructions received from the television service provider have indeed been executed.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 230, other non-video/audio data 231, DVR database 245, time-shift buffer 243, user profiles 247, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions and/or time-shift buffer functions (e.g., viewer navigation of live television programming) of television receiver 200, and/or to enable viewing and/or recording of multiple television channels simultaneously.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of timing signals), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 240 and/or PMT 257 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

While a large portion of storage space of storage medium 225 is devoted to storage of television programming, a portion may be devoted to storage of non-audio/video data, such as EPG database 230 and other non-video/audio data 231. This "other" data may permit television receiver 200 to function properly. In some embodiments, at least ten gigabytes are allocated to such other data. For example, if NIT 240 is stored by storage medium 225, it may be part of other non-video/audio data 226.

User profiles 247 may include stored user preferences. For example, a user may specify a preferred category of television programming, such as: sports, news, movies, sitcoms, reality, etc. The user may also specify whether they prefer broadcast ("live") television, on-demand programming, or recorded television programming (via user or provider-defined timers). In some embodiments, data for a user's profile may be defined based on measured viewing habits, such as which television channels and/or categories of television programming does the user watch. User profiles 247 may specify which television programs were recorded based on timers set by the user associated with a specific user profile. User profiles 247 may include profiles for multiple users or may include a single profile for the television receiver in general. In some embodiments, a user is permitted to select which user profile of user profiles 247 is active. For instance, a user can log on to television receiver 200. In other embodiments, the television receiver 200 may be configured to identify a user and select a user profile 247 for use automatically, such as through facial recognition using an associated image capture device, biometric recognition, such as a fingerprint detection device incorporated into a remote control or identification through devices carried on a person, such as RFID, NFC cards or pairing to a mobile communication device.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, each of decoders 234 within decoder module 233 may be able to only decode a single television channel at a time. While decoder module 233 is illustrated as having three decoders 234 (decoder 234-1, decoder 234-2, and decoder 234-3), in other embodiments, a greater or fewer number of decoders may be present in television receiver 200. A decoder may be able to only decode a single high definition television program at a time. However, a decoder may be able to decode multiple preview clips at the same time.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to satellite television distribution system 100 of FIG. 1, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

DVR Database 245 may also store television programming that is recorded based on analysis of user profiles 247. For instance, if a user frequently watches and/or records sports, a major sporting event may be selected by control processor 210-1 for recording based on the user's profile. The day of the week, channel, and/or time of previously set timers may also be used to record television programming. For instance, if a user has previously set a timer to record television channel five at 8 PM on Thursdays, control processor 210-1 may set a timer for this same day of the week, channel, and time for some point in the future (even though the user has not specifically selected it).

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. On-demand programming may not be user-selected. As such, the television programming stored to on-demand programming storage 227 may be the same for each television receiver of a television service provider.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1. In some embodiments, it may be possible to load some or all preferences to a remote control. As such, the remote control can serve as a backup storage device for the preferences.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card or the like.

Tuning management processor 210-2 may be in communication with tuners 215 and control processor 210-1. Tuning management processor 210-2 may be configured to receive commands from control processor 210-1. Such commands may indicate when to start/stop receiving and/or recording of a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recording, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or security device 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2. Similar to a PID filter being created for a particular television channel, a PID filter may be created for timing signals for use in determining the location of the television receiver.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

External storage device 252 may represent an external, detachable computer-readable non-transitory storage device. The storage device may be memory, a hard drive, or some other type of device for storing computer-readable data. The user may be permitted to connect and disconnect external storage device 252 to increase and decrease an amount of storage space available for storing on-demand programming, service provider-managed television programming, and/or user managed television programming.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 400 of FIG. 4.

While the television receiver 200 has been illustrated as a satellite receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations.

Figure 3:
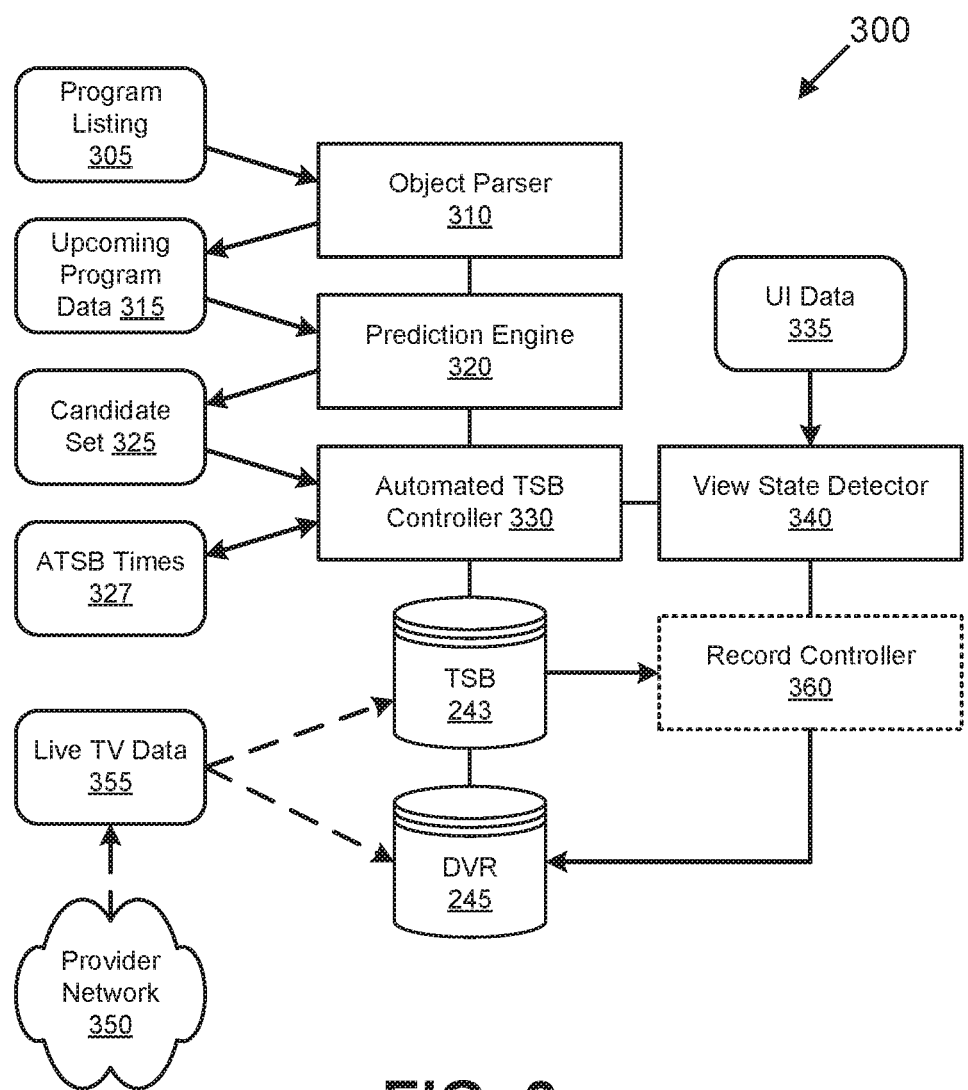
FIG. 3 shows an illustrative implementation of a record control engine, according to various embodiments.

FIG. 3 shows an illustrative implementation of a record control engine 300, according to various embodiments. The record control engine 300 can be an implementation of the record control engine 211 of FIG. 2, and the record control engine 300 can be implemented as one or more processors, one or more state machines, or in any other suitable manner. Embodiments can operate in context of a television receiver that receives live television programming data 355 via one or more provider networks 350 (e.g., a satellite television network). As described herein, the received live television programming data 355 can generally be viewed live via a television or other suitable display device, and/or buffered, recorded, and/or otherwise stored by a time-shift buffer (TSB) 243, a DVR 245, or other suitable storage device. As illustrated, the record control engine 300 can include an object parser 310, a prediction engine 320, an automated TSB controller 350, and a view state detector 340.

Embodiments of the object parser 310 can receive a program listing 305 identifying live television programs scheduled as deliverable via the television receiver, and can output upcoming program data 315 identifying the live television programs. For example, the program listing 305 can be received from, parsed from, and/or otherwise derived from EPG data, or any other suitable source. The output upcoming program data 315 can indicate any suitable information relating to the upcoming programs, such as program start time, program end time, program run time, program channel, program title, etc.

Embodiments of the prediction engine 320 can be coupled with the object parser 310 to identify a set of candidate programs 325 from the upcoming program data 315. The set of candidate programs 325 can be identified, so that each candidate program in the set identifies a corresponding live television program as likely to be viewed live via the television receiver. In some implementations, the prediction engine 320 computes a live-view score for each program identified in the upcoming program data 315 as a function of applying a behavioral prediction model to the upcoming program data 315, and identifies the set of candidate programs 325 responsive to determining that the respective live-view scores for identified programs of the upcoming program data 315 exceed a predetermined live-view likelihood threshold. In some such implementations, the predicting can involve determining one or more episodic programs that a viewer tends to view live, and determining whether an upcoming program is a next episode (or a missed episode) of the one or more episodic programs. In other such implementations, the predicting can involve determining characteristics of television programs a viewer tends to watch live, and determining whether an upcoming program has similar characteristic that suggest the viewer would similarly be likely to view the upcoming program live. For example, such functionality can be implemented by a machine learning algorithm that uses previous viewing behavior of at least the viewer as training data for computing future predictions of that viewer's behavior. Other implementations can identify the candidate program as a next program being shown on the same channel the viewer was previously watching (e.g., before the last time the viewer turned off the television, television receiver, etc.).

Embodiments of the automated TSB controller 350 can be coupled with the prediction engine 320 to determine automated time-shift buffering (ATSB) times 327 for each of the set of candidate programs 325. In some cases, the automated TSB controller 350 determines an ATSB trigger time and an ATSB flush time in accordance with the program start time associated with each candidate program. In some implementations, the ATSB trigger time is the start time of the candidate program. In other implementations, the ATSB trigger time can be some predetermined amount of time preceding the start time of the candidate program (e.g., 10 seconds before, 5 minutes before, etc.), and the predetermined amount of time can be fixed by the television receiver provider, programmable by the viewer, etc. Certain implementations can include functionality for automatically detecting an appropriate ATSB trigger time, such as, by analyzing programming content to detect the end of a preceding program (e.g., using machine vision, or the like, to look for ending credits, etc.). In some implementations, the ATSB flush time is a predetermined amount of time after the start time of the candidate program (e.g., or after the ATSB start time), such as 5 minutes into the program, 10 minutes into the program, etc. In other implementations, the ATSB flush time is defined as a fraction or percentage of the run time of the candidate program (e.g., a quarter of the run time, such that the ATSB is 7.5 minutes into a 30-minute candidate program, 15 minutes into an hour-long candidate program, etc.). Certain implementations can track and model viewer behavior to determine an appropriate ATSB flush time. For example, embodiments can determine, based on statistical models, that in almost every case where a particular viewer begins watching a program late, the viewer begins watching within 6 minutes of the program start time. In such a case, the ATSB flush time can be set in accordance with 6 minutes (e.g., at 6 minutes after the program start time, at some fixed time or percentage in excess of 6 minutes, etc.). In some embodiments, the ATSB flush time corresponds to the end time (e.g., or run time) of the candidate program. For example, determining the ATSB flush time can include computing an ATSB time window as function of a total run time associated with the candidate program, such that the ATSB flush time is the end of the ATSB time window.

Embodiments of the view state detector 340 can determine whether a particular candidate program is being viewed live via the television receiver at the ATSB trigger time. For example, the view state detector 340 can monitor user interface (UI) data 335 (e.g., remote control data, state of one or more televisions or other display devices, etc.) to determine if a particular program is apparently being watched live at a particular time. If the candidate program is not being viewed live via the television receiver at the ATSB trigger time, the view state detector 340 can direct the time-shift buffer 243 to begin buffering the candidate program in accordance with the program start time (e.g., at the ATSB trigger time, at the program start time, or at any other suitable time related to the program start time). In that way, should a viewer begin watching the television program live subsequent to the program start time, the viewer may be able to rewind via the time-shift buffer 243 to portions of the candidate program that showed prior to when the viewer began watching. In some embodiments, prior to directing the time-shift buffer 243 to begin predictively buffering the candidate program, the view state detector 340 (or other suitable component) can determine whether the candidate program is already scheduled to be recorded (e.g., by the DVR 245). In an alternative implementation, the object parser 310 can output upcoming program data 315 identifying only those of the live television programs not already scheduled for recording to a device of the viewer. In another alternative implementation, the prediction engine 320 can identify the set of candidate programs 325 from the upcoming program data 315 only to include candidate programs not scheduled for recording to a device of the viewer.

Some embodiments of the view state detector 340 can further determine whether the candidate program is still not being viewed live via the television receiver at the ATSB flush time. For example, the view state detector 340 directed the time-shift buffer 243 to predictively buffer the candidate program in accordance with the viewer not watching the program live as of the ATSB trigger time, and the candidate program is still not being watched live as of the ATSB flush time. In response to determining that the candidate program is still not being viewed live via the television receiver at the ATSB flush time, the view state detector 340 can direct the time-shift buffer 243 automatically to flush some or all of the as-yet-buffered data of the candidate program.

Some embodiments of the record control engine 300 further include a record controller 360. Embodiments of the record controller 360 can be coupled with the automated TSB controller 350 (e.g., directly, via the view state detector 340, or in any suitable manner). For example, while the time-shift buffer 243 is buffering the candidate program (e.g., subsequent to the ATSB trigger time), the record controller 360 can receive a record command (e.g., received by the view state detector 340 as UI data 355 from a remote control, or in any other suitable manner, and passed to the record controller 360). In response to receiving the record command, the record controller 360 can direct storage of at least the as-yet-buffered data of the candidate program to persistent storage, such as to the DVR 245. For example, a viewer is watching the candidate program live while the candidate program is being buffered by the time-shift buffer 243, and the viewer decides to record the program. In such a case, the record controller 360 can effectively direct the already buffered data for the candidate program (e.g., including predictively buffered data) to be moved to persistent storage, or marked for persistent storage. In some such cases, the record controller 360 can further direct the record control engine 300 to continue recording until at least the end of the candidate program, even if the viewer stops watching the program live prior to the program end time.

Figure 4:
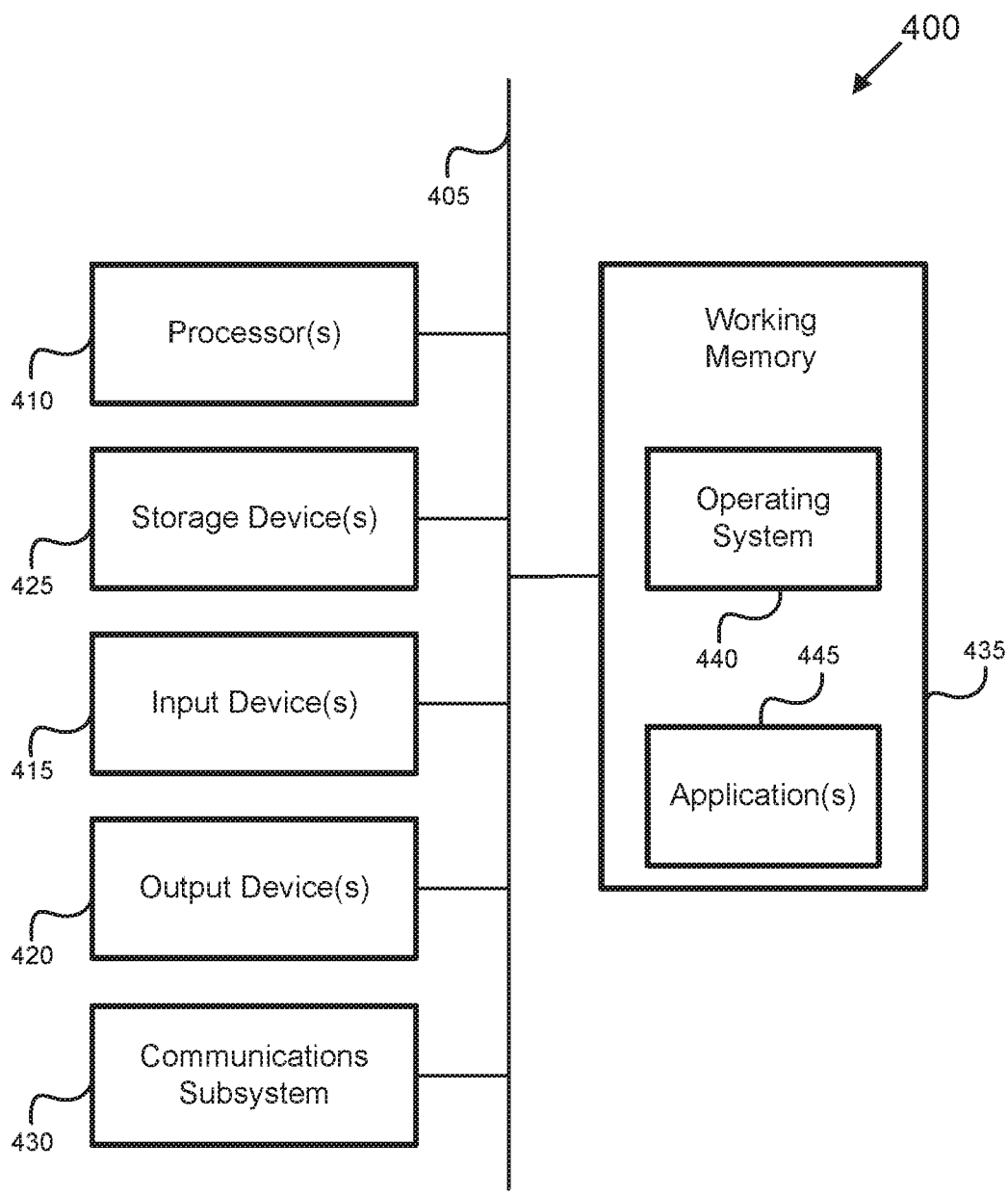
FIG. 4 provides a schematic illustration of one embodiment of a computer system that can perform various steps of the methods provided by various embodiments.

A computer system as illustrated in FIG. 4 may be incorporated as part of the previously described computerized devices, such as the television receivers. FIG. 4 provides a schematic illustration of one embodiment of a computer system 400 that can perform various steps of the methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like); one or more input devices 415, which can include, without limitation, a mouse, a keyboard, remote control, and/or the like; and one or more output devices 420, which can include, without limitation, a display device, a printer, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 400 might also include a communications subsystem 430, which can include, without limitation, a modem, a network card (wireless or wired), an infrared communication device, a wireless communication device, and/or a chipset (such as a Bluetooth™ device, an 402.11 device, a WiFi device, a WiMax device, cellular communication device, etc.), and/or the like. The communications subsystem 430 may permit data to be exchanged with a network (such as the network described below, to name one example), other computer systems, and/or any other devices described herein. In many embodiments, the computer system 400 will further comprise a working memory 435, which can include a RAM or ROM device, as described above.

The computer system 400 also can comprise software elements, shown as currently being located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes might be stored on a non-transitory computer-readable storage medium, such as the non-transitory storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 might cause the processor(s) 410 to perform one or more procedures of the methods described herein.

For example, an embodiment of a non-transitory processor-readable medium can include processor-readable instructions that cause one or more processors of a television receiver to: obtain upcoming program data identifying a plurality of live television programs; identify a candidate program from the upcoming program data, such that the candidate program identifies one of the plurality of live television programs as likely to be viewed live via the television receiver; determine an automated time-shift buffer (ATSB) trigger time and an ATSB flush time in accordance with a program start time associated with the candidate program; determine whether the candidate program is being viewed live via the television receiver at the ATSB trigger time; and, automatically in response to determining that the candidate program is not being viewed live via the television receiver at the ATSB trigger time, to direct a time-shift buffer associated with the television receiver to begin buffering the candidate program in accordance with the program start time, and to direct the time-shift buffer to flush as-yet-buffered data of the candidate program automatically in response to determining that the candidate program is still not being viewed live via the television receiver at the ATSB flush time. In some cases, the processor-readable instructions cause the one or more processors of the television receiver further to: receive, while the time-shift buffer is buffering the candidate program subsequent to the ATSB trigger time, a record command from a user interface device of an end user viewing the candidate program live via the television receiver; and to direct storage, to a persistent data store, of at least the as-yet-buffered data of the candidate program responsive to the record command.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 (and/or components thereof) generally will receive signals, and the bus 405 then might carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

Figure 5:
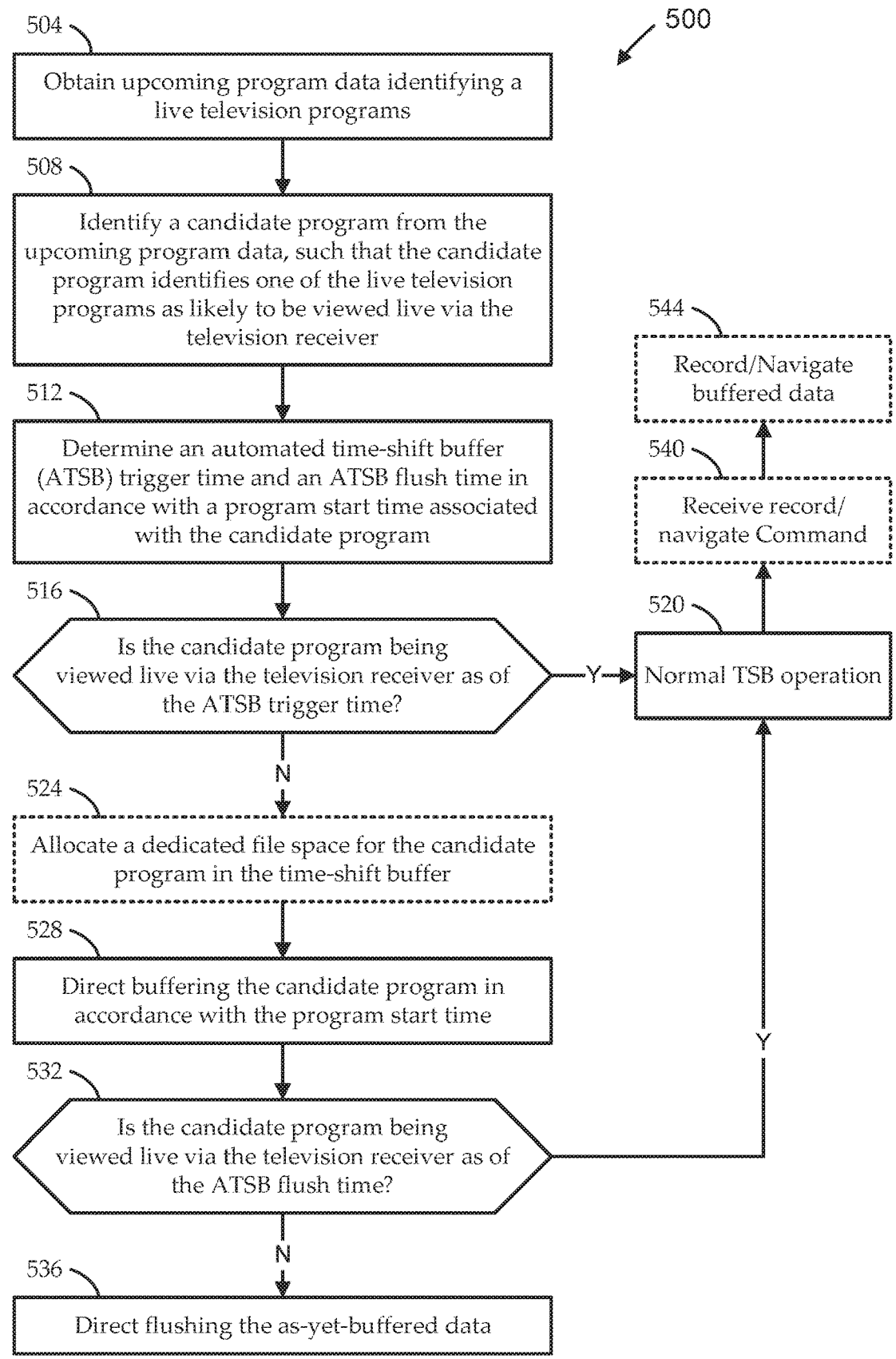
FIG. 5 shows a flow diagram of an illustrative method for time-shift buffering of live television programming by a television receiver having a time-shift buffer, according to various embodiments.

Systems including those described above can be used to implement various methods 500. FIG. 5 shows a flow diagram of an illustrative method 500 for time-shift buffering of live television programming by a television receiver having a time-shift buffer, according to various embodiments. Embodiments of the method 500 begin at stage 504 by obtaining upcoming program data identifying live television programs. For example, the upcoming program data can be obtained from EPG data and/or from any other suitable source (e.g., broadcast network schedules, Internet sources, etc.). The upcoming program data can identify any suitable information relating to upcoming live television programming, such as a program title, program rating, program start time, program end time and/or run length, television channel showing the program, whether the program is a first-run or a re-run, whether the program is already being recorded on a DVR associated with the television receiver, etc.

At stage 508, embodiments can identify a candidate program from the upcoming program data, such that the candidate program identifies one of the live television programs as likely to be viewed live via the television receiver. In some implementations, the candidate program is identified by predicting which of the upcoming live television programs are likely to be viewed live by one or more viewer associated with the television receiver. For example, the identifying at stage 508 can involve computing a live-view score for the one of the plurality of live television programs as a function of applying a behavioral prediction model to the upcoming program data, and identifying the candidate program responsive to determining that the live-view score for the one of the plurality of live television programs exceeds a predetermined live-view likelihood threshold. In some such implementations, the predicting can involve determining one or more episodic programs that a viewer tends to view live, and determining whether an upcoming program is a next episode (or a missed episode) of the one or more episodic programs. In other such implementations, the predicting can involve determining characteristics of television programs a viewer tends to watch live, and determining whether an upcoming program has similar characteristic that suggest the viewer would similarly be likely to view the upcoming program live. For example, such functionality can be implemented by a machine learning algorithm that uses previous viewing behavior of at least the viewer as training data for computing future predictions of that viewer's behavior. Other implementations can identify the candidate program as a next program being shown on the same channel the viewer was previously watching (e.g., before the last time the viewer turned off the television, television receiver, etc.).

At stage 512, embodiments can determine an ATSB trigger time and an ATSB flush time in accordance with a program start time associated with the candidate program. In some implementations, the ATSB trigger time is the start time of the candidate program. In other implementations, the ATSB trigger time can be some predetermined amount of time preceding the start time of the candidate program (e.g., 10 seconds before, 5 minutes before, etc.), and the predetermined amount of time can be fixed by the television receiver provider, programmable by the viewer, etc. Certain implementations can include functionality for automatically detecting an appropriate ATSB trigger time, such as, by analyzing programming content to detect the end of a preceding program (e.g., using machine vision, or the like, to look for ending credits, etc.).

In some implementations, the ATSB flush time is a predetermined amount of time after the start time of the candidate program (e.g., or after the ATSB start time), such as 5 minutes into the program, 10 minutes into the program, etc. In other implementations, the ATSB flush time is defined as a fraction or percentage of the run time of the candidate program (e.g., a quarter of the run time, such that the ATSB is 7.5 minutes into a 30-minute candidate program, 15 minutes into an hour-long candidate program, etc.). Certain implementations can track and model viewer behavior to determine an appropriate ATSB flush time. For example, embodiments can determine, based on statistical models, that in almost every case where a particular viewer begins watching a program late, the viewer begins watching within 6 minutes of the program start time. In such a case, the ATSB flush time can be set in accordance with 6 minutes (e.g., at 6 minutes after the program start time, at some fixed time or percentage in excess of 6 minutes, etc.). In some embodiments, the ATSB flush time corresponds to the end time (e.g., or run time) of the candidate program. For example, determining the ATSB flush time can include computing an ATSB time window as function of a total run time associated with the candidate program, such that the ATSB flush time is the end of the ATSB time window.

At stage 516, a determination can be made as to whether the candidate program is being viewed live via the television receiver at the ATSB trigger time. For example, by or before the start time of the candidate program, embodiments can determine whether a television, or other viewing device associated with the television receiver, is turned on and tuned to the channel showing the candidate program. If the candidate program is already being viewed live at the ATSB trigger time, some embodiments can proceed with normal time-shift buffer operation at stage 520. For example, the time-shift buffer can be configured automatically to buffer whatever television program is being viewed live. Accordingly, if the candidate program is already being viewed live prior to the ATSB trigger time, the result of normal operation of the time-shift buffer can be that the time-shift buffer is already buffering the candidate program.

In some cases, the determination at stage 516 is that the candidate program is not being viewed live via the television receiver at the ATSB trigger time. For example, such cases can arise when the television or other viewing device associated with the television receiver is turned off, when the television or other viewing device associated with the television receiver is tuned to a different channel than the one showing the candidate program, etc. In such cases, embodiments can direct the time-shift buffer to begin buffering the candidate program in accordance with the program start time at stage 528. In some implementations, such directing at stage 528 can include ensuring that the television receiver is tuned to the channel showing the candidate program. In other implementations, such directing at stage 528 can include, at stage 524, allocating a dedicated file space for the candidate program in the time-shift buffer; associating the dedicated file space with a portion of the upcoming program data corresponding to the candidate program; and directing the time-shift buffer to buffer the candidate program by storing, to the dedicated file space, portions of the candidate program received via the television receiver.

At stage 532, a further determination can be made as to whether the candidate program is still not being viewed live via the television receiver at the ATSB flush time. For example, the candidate program was not being viewed as of the ATSB trigger time according to stage 516, and the determination at stage 532 is whether the viewer began watching the candidate program live at some point after the ATSB trigger time and prior to the ATSB flush time. If so (i.e., if the viewer did begin viewing the candidate program live prior to the ATSB flush time), some embodiments can continue with normal time-shift buffer operation at stage 520. The time-shift buffer can continue to buffer the candidate program as it would for any program being watched, except that the time-shift buffer has, buffered thereon, the portion of the candidate program that occurred prior to the viewer beginning to watch the program live. Suppose, for example, that the ATSB trigger time is two minutes prior to the start time of the candidate program, the ATSB flush time is ten minutes after the start time of the candidate program, the viewer begins watching the candidate program five minutes after the start time of the candidate program, and it is now 15 minutes into the candidate program. The time-shift buffer can have, buffered thereon, 17 previous minutes of programming from the currently watched channel, including seven minutes of programming prior to when the viewer began watching.

If the determination at stage 532 is that the candidate program is still not being viewed live via the television receiver at the ATSB flush time, embodiments can direct the time-shift buffer automatically to flush as-yet-buffered data of the candidate program. For example, some implementations assume that, if the viewer still has not started watching the candidate program when the ATSB flush time has passed, the viewer will likely not watch the program at all. Accordingly, the buffer can automatically flush its contents (e.g., delete some or all of the buffered data for the candidate program from the time-shift buffer, overwrite some or all of the buffered data for the candidate program on the time-shift buffer, modify metadata or otherwise tag some or all of the buffered data for the candidate program on the time-shift buffer to indicate it as flushed, etc.).

Some embodiments of the method 500 include additional functionality for use with data of the candidate program that is buffered in the time-shift buffer. For example, at stage 540, while the time-shift buffer is buffering the candidate program subsequent to the ATSB trigger time, a record or navigate command can be received from a user interface device of an end user viewing the candidate program live via the television receiver. If the received command is a navigate command (e.g., pause, rewind, etc.), at stage 544, embodiments can retrieve a buffered portion of the candidate program from the time-shift buffer responsive to the navigation command. In such cases, the buffered portion can be displayed to the end user responsive to the navigation command. For example, in response to the viewer pressing a rewind button on a remote control, embodiments can use the buffered data to rewind playback of the candidate program, even though the program is being viewed live.

If the received command is a record command (e.g., the viewer interfaces with a record button on a remote control), at stage 544, embodiments can direct storage of at least the as-yet-buffered data of the candidate program responsive to the record command. For example, the storage can be from non-persistent storage in the time-shift buffer to persistent storage in a DVR, or other suitable data store. In some such embodiments, directing the storage at stage 544 includes, responsive to the record command, directing the time-shift buffer to continue buffering the candidate program until at least a program end time associated with the candidate program, such that the time-shift buffer comprises a complete buffered instance of the candidate program. Such embodiments can then direct storage (e.g., to the persistent data store) of the complete buffered instance of the candidate program. In some implementations, the as-yet-buffered data of the candidate program is stored in association with a storage type tag indicating that the as-yet-buffered data is non-persistent time-shift buffer data, and directing storage at stage 544 includes updating the storage type tag to indicate that the as-yet-buffered data is persistent recorded data.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for time-shift buffering of live television programming by a television receiver having a time-shift buffer, the time-shift buffer configured as non-persistent storage, the method comprising:
obtaining upcoming program data identifying a plurality of live television programs;
identifying, automatically by the television receiver, a candidate program from the upcoming program data, such that the candidate program identifies one of the plurality of live television programs as likely to be viewed live via the television receiver, and each candidate program is not already scheduled to be recorded;
determining an automated time-shift buffer (ATSB) trigger time and an ATSB flush time in accordance with a program start time associated with the candidate program, the ATSB flush time being set to elapse prior to a program end time associated with the candidate program;
determining whether the candidate program is being viewed live via the television receiver at the ATSB trigger time;
directing the time-shift buffer to begin buffering the candidate program in accordance with the program start time automatically in response to determining that the candidate program is not being viewed live via the television receiver at the ATSB trigger time; and
directing the time-shift buffer to cease buffering the candidate program and to flush as-yet-buffered data of the candidate program automatically in response to determining that the candidate program is still not being viewed live via the television receiver at the ATSB flush time.

2. The method of claim 1, further comprising:
receiving, while the time-shift buffer is buffering the candidate program subsequent to the ATSB trigger time, a record command from a user interface device of an end user viewing the candidate program live via the television receiver; and
directing storage, to a persistent data store, of at least the as-yet-buffered data of the candidate program responsive to the record command.

3. The method of claim 2, wherein the directing storage comprises, responsive to the record command:
directing the time-shift buffer to continue buffering the candidate program until at least a program end time associated with the candidate program, such that the time-shift buffer comprises a complete buffered instance of the candidate program; and
directing storage, to the persistent data store, of the complete buffered instance of the candidate program.

4. The method of claim 2, wherein:
the as-yet-buffered data of the candidate program is stored in association with a storage type tag indicating that the as-yet-buffered data is non-persistent time-shift buffer data; and
the directing storage comprises updating the storage type tag to indicate that the as-yet-buffered data is persistent recorded data.

5. The method of claim 1, further comprising:
receiving, while the time-shift buffer is buffering the candidate program subsequent to the ATSB trigger time, a navigation command from a user interface device of an end user viewing the candidate program live via the television receiver;
retrieving a buffered portion of the candidate program from the time-shift buffer responsive to the navigation command; and
displaying the buffered portion to the end user responsive to the navigation command.

6. The method of claim 1, wherein directing the time-shift buffer to begin buffering the candidate program comprises:
allocating a dedicated file space for the candidate program in the time-shift buffer;
associating the dedicated file space with a portion of the upcoming program data corresponding to the candidate program; and
directing the time-shift buffer to buffer the candidate program by storing, to the dedicated file space, portions of the candidate program received via the television receiver.

7. The method of claim 1, wherein the identifying comprises:

computing a live-view score for the one of the plurality of live television programs as a function of applying a behavioral prediction model to the upcoming program data; and identifying the candidate program responsive to determining that the live-view score for the one of the plurality of live television programs exceeds a predetermined live-view likelihood threshold.

8. The method of claim 1, wherein the identifying comprises:

determining a last-watched channel associated with the television receiver; and identifying the candidate program responsive to determining the last-watched channel, such that the candidate program corresponds to a television program of the plurality of live television programs scheduled to be upcoming on the last-watched channel.

9. The method of claim 1, wherein the obtaining comprises parsing the upcoming program data from electronic program guide data.

10. The method of claim 1, wherein the ATSB trigger time is the program start time.

11. The method of claim 1, wherein the ATSB flush time is a predetermined fixed amount of time from the ATSB trigger time.

12. The method of claim 1, wherein:

determining the ATSB flush time comprises computing an ATSB time window as function of a total run time associated with the candidate program; and the ATSB flush time is the end of the ATSB time window.

13. A live television record control system associated with a television receiver, the system comprising:

an object parser to receive a program listing identifying a plurality of live television programs scheduled as deliverable via the television receiver, and to output upcoming program data identifying the plurality of live television programs;

a prediction engine coupled with the object parser automatically to identify a set of candidate programs from the upcoming program data, such that each candidate program identifies a corresponding one of the plurality of live television programs as likely to be viewed live via the television receiver, and each candidate program is not already scheduled to be recorded; and an automated time-shift buffer (ATSB) controller coupled with the prediction engine to, for each of the set of candidate programs:

determine an automated time-shift buffering (ATSB) trigger time and an ATSB flush time in accordance with a program start time associated with the candidate program, the ATSB flush time being set to elapse prior to a program end time associated with the candidate program;

determine whether the candidate program is being viewed live via the television receiver at the ATSB trigger time;

direct a time-shift buffer to begin buffering the candidate program in accordance with the program start time automatically in response to determining that the candidate program is not being viewed live via the television receiver at the ATSB trigger time; and direct the time-shift buffer to cease buffering the candidate program and to flush as-yet-buffered data of the candidate program automatically in response to determining that the candidate program is still not being viewed live via the television receiver at the ATSB flush time.

14. The system of claim 13, further comprising:

a record controller coupled with the ATSB controller to direct storage, to a persistent data store, of at least the as-yet-buffered data of the candidate program responsive to a record command received, while the time-shift buffer is buffering the candidate program subsequent to the ATSB trigger time, from a user interface device of an end user viewing the candidate program live via the television receiver.

15. The system of claim 14, further comprising:

a storage device having stored thereon the time-shift buffer and the persistent data store.

16. The system of claim 13, further comprising:

a view state controller coupled with the ATSB controller, wherein the ATSB controller determines whether the candidate program is being viewed live via the television receiver at the ATSB trigger time by communicating with the view state controller.

17. A non-transitory processor-readable medium comprising processor-readable instructions that cause one or more processors of a television receiver to:

obtain upcoming program data identifying a plurality of live television programs;

identify a candidate program automatically from the upcoming program data, such that the candidate program identifies one of the plurality of live television programs as likely to be viewed live via the television receiver, and each candidate program is not already scheduled to be recorded;

determine an automated time-shift buffer (ATSB) trigger time and an ATSB flush time in accordance with a program start time associated with the candidate program, the ATSB flush time being set to elapse prior to a program end time associated with the candidate program;

determine whether the candidate program is being viewed live via the television receiver at the ATSB trigger time;

direct the time-shift buffer to begin buffering the candidate program in accordance with the program start time automatically in response to determining that the candidate program is not being viewed live via the television receiver at the ATSB trigger time; and direct the time-shift buffer to cease buffering the candidate program and to flush as-yet-buffered data of the candidate program automatically in response to determining that the candidate program is still not being viewed live via the television receiver at the ATSB flush time.

18. The non-transitory processor-readable medium of claim 17, wherein the processor-readable instructions cause the one or more processors of the television receiver further to:

receive, while the time-shift buffer is buffering the candidate program subsequent to the ATSB trigger time, a record command from a user interface device of an end user viewing the candidate program live via the television receiver; and direct storage, to a persistent data store, of at least the as-yet-buffered data of the candidate program responsive to the record command.

19. The non-transitory processor-readable medium of claim 17, wherein the processor-readable instructions cause the one or more processors of the television receiver to direct the time-shift buffer to begin buffering the candidate program by:

allocating a dedicated file space for the candidate program in the time-shift buffer;

associating the dedicated file space with a portion of the upcoming program data corresponding to the candidate program; and directing the time-shift buffer to buffer the candidate program by storing, to the dedicated file space, portions of the candidate program received via the television receiver.

20. The non-transitory processor-readable medium of claim 17, wherein the processor-readable instructions cause the one or more processors of the television receiver to identify candidate program from the upcoming program data by:

computing a live-view score for the one of the plurality of live television programs as a function of applying a behavioral prediction model to the upcoming program data; and identifying the candidate program responsive to determining that the live-view score for the one of the plurality of live television programs exceeds a predetermined live-view likelihood threshold.

* * * * *